United States Patent [19]

Iyotani et al.

[11] 4,223,236

[45] Sep. 16, 1980

[54] GATE CONTROLLING APPARATUS FOR A THYRISTOR VALVE

[75] Inventors: Ryuji Iyotani; Atsumi Watanabe, both of Hitachi, Japan

[73] Assignee: Hitachi, Ltd., Tokyo, Japan

[21] Appl. No.: 924,007

[22] Filed: Jul. 12, 1978

[30] Foreign Application Priority Data

Jul. 13, 1977 [JP] Japan .................................. 52/82989

[51] Int. Cl.² .......................................... H03K 17/72
[52] U.S. Cl. .......................... 307/252 Q; 307/252 L; 363/68
[58] Field of Search ........... 307/252 N, 252 L, 252 Q; 363/68, 46, 129

[56] References Cited

U.S. PATENT DOCUMENTS

| | | | |
|---|---|---|---|
| 3,728,557 | 4/1973 | Pelly et al. | 307/252 N |
| 3,878,448 | 4/1975 | Jackson et al. | 307/252 L |
| 3,881,147 | 4/1975 | Veda et al. | 363/68 X |
| 4,084,206 | 4/1978 | Leowald et al. | 307/252 L |
| 4,084,221 | 4/1978 | Ogata | 363/68 X |

*Primary Examiner*—John Zazworsky
*Attorney, Agent, or Firm*—Craig & Antonelli

[57] ABSTRACT

A thyristor valve includes a plurality of thyristors connected in series and series circuits each including a capacitor and a resistor and connected in parallel with each thyristor. A pulse from a pulse generator for firing the thyristors is applied to them at the beginning of a prescribed period of conduction of the thyristor valve when voltage across the selected one of the thyristors is forward. An output signal of a current detector provides a firing pulse to all thyristors when the valve current exceeds a predetermined current value during the prescribed period of conduction of the thyristor valve.

6 Claims, 8 Drawing Figures

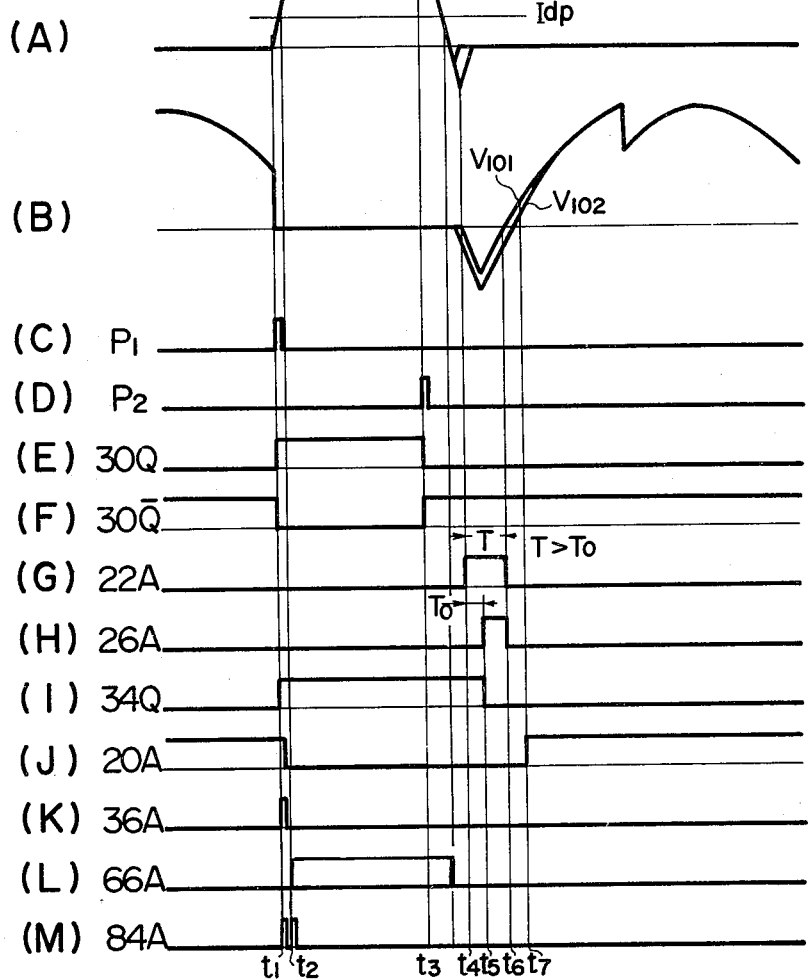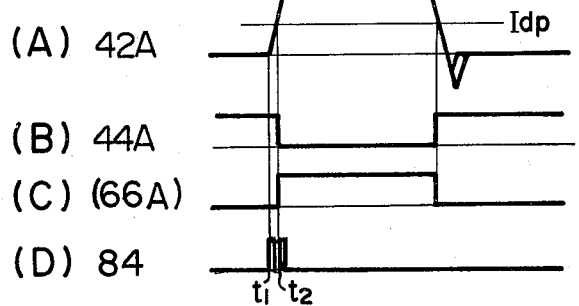

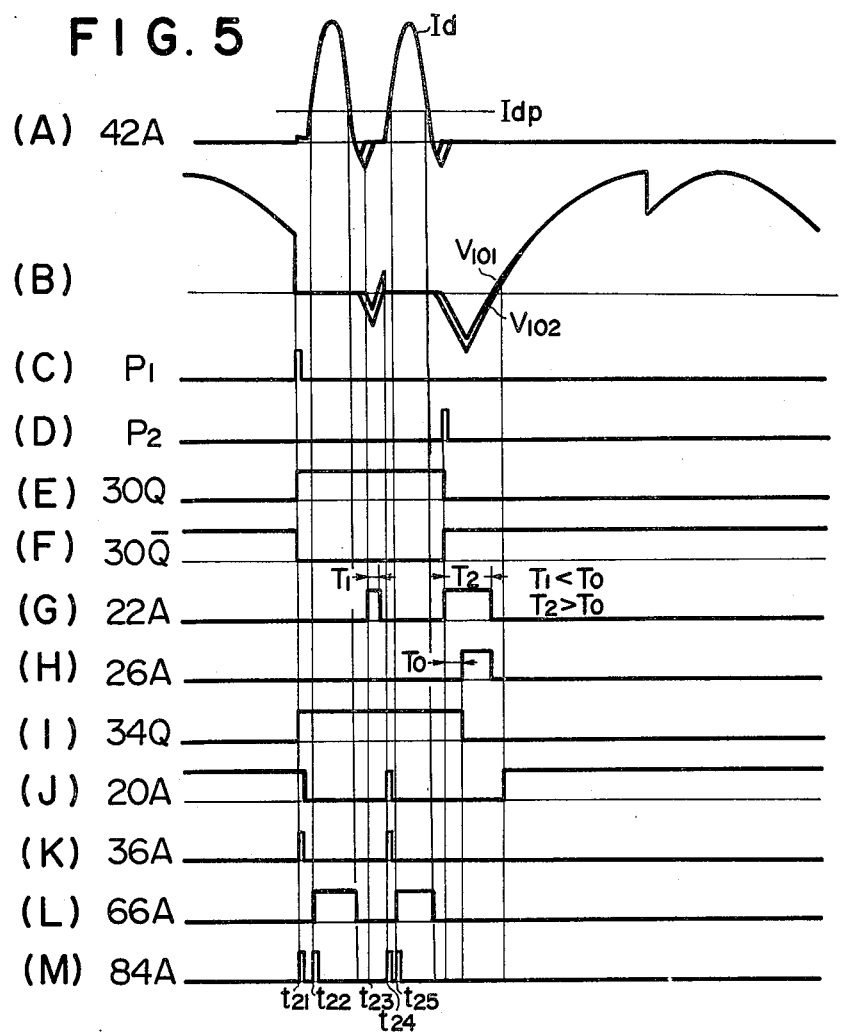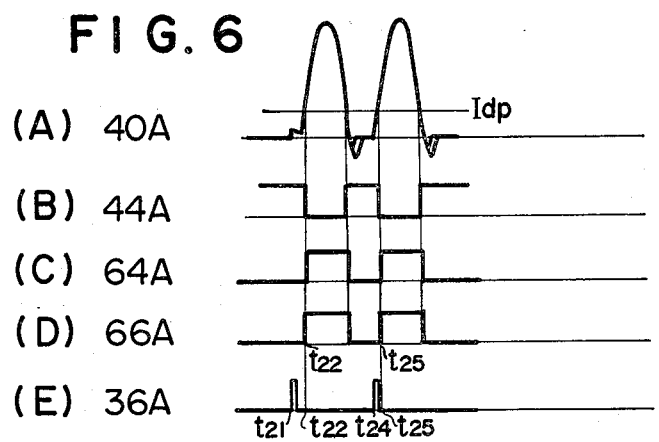

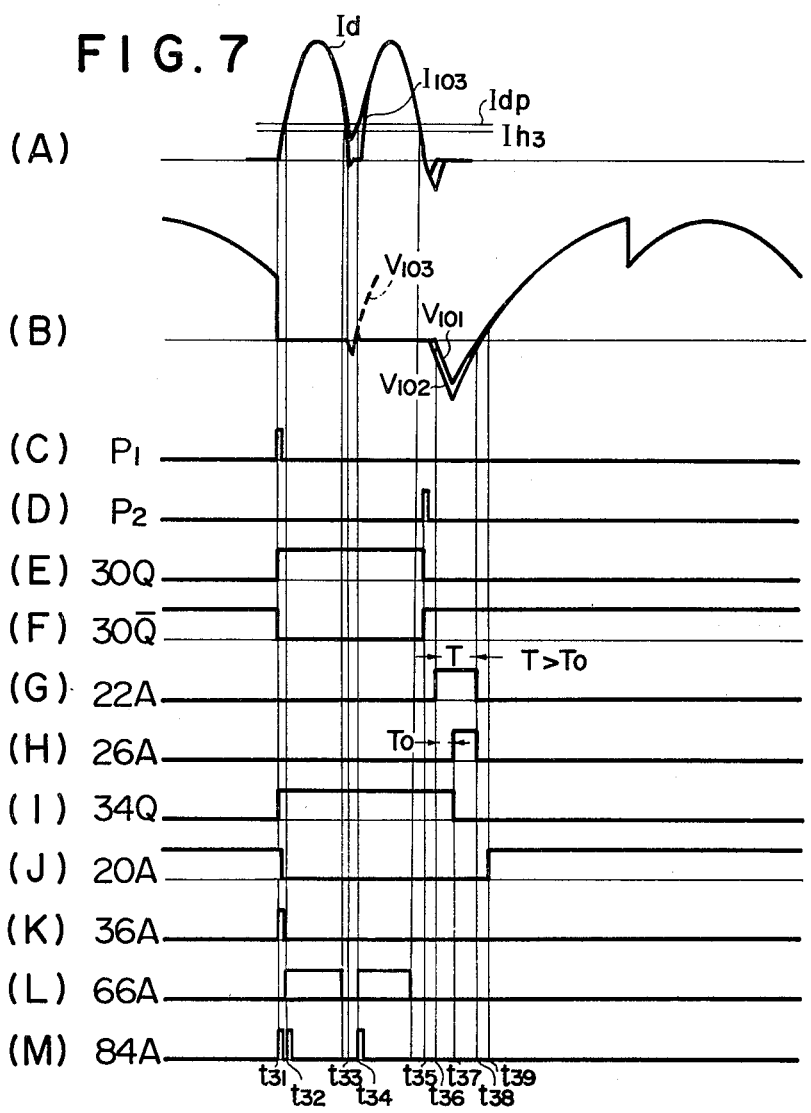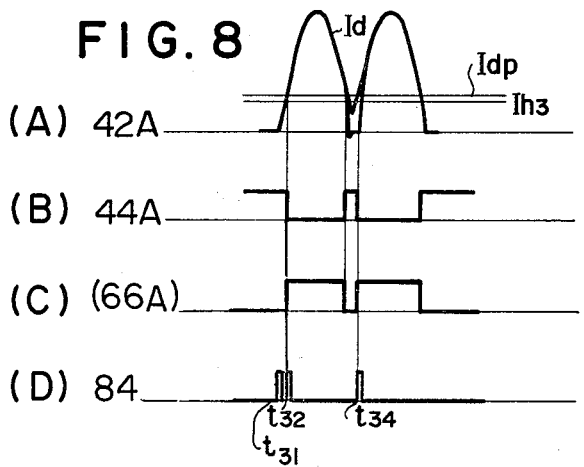

GATE CONTROLLING APPARATUS FOR A THYRISTOR VALVE

This invention relates to a gate controlling apparatus for a thyristor valve including a plurality of series-connected thyristors having different holding currents and series circuits each including a capacitor and a resistor and connected in parallel with each thyristor of the thyristor valve.

A wide width pulse gate controlling method is most usually used as the method of gate-controlling a thyristor valve including a plurality of series-connected thyristors. According to this method, for example, in the case of a three phase bridge converter, the thyristors are supplied with wide width firing pulses each having a duration of 120° corresponding to the full conduction duration of each arm of the bridge. Since gate signals are being supplied to the gates of all the thyristors included in the thyristor valve during the full duration of a prescribed conduction period of the thyristor valve, then even if one or some thyristors is extinguished for some cause or other, the extinguished thyristor will be fired again so long as the forward voltage is applied thereto. However, the wide width pulse gate controlling method uses a gating pulse having a long duration and therefore it has a drawback that the power consumption is large and the size of the apparatus embodying the method becomes large, too. In order to eliminate this drawback, a narrow width pulse gate controlling method, according to which gate pulses are delivered only during the periods for which the thyristors are to be conductive, has been proposed instead of the wide width pulse gate controlling method.

The duration of the narrow width pulse is substantially equal to the period of time required to establish the thyristors in the conductive state and the time shorter than the prescribed conduction period of the thyristor valve. Such a method is disclosed in a copending U.S. Patent Application Ser. No. 669,751 titled "GATE CONTROLLING APPARATUS FOR THYRISTOR VALVE", filed by R. Iyotani et al. on Mar. 24, 1976.

According to the narrow width pulse gate controlling method mentioned above, the voltage across a selected one of the thyristors is detected so that when a forward voltage is detected during a prescribed conduction period of the thyristor valve, a firing pulse is immediately delivered. Moreover, with this method, it is only necessary to detect the forward voltage appearing across the selected one of the thyristors so that the embodied apparatus can have a simple structure. On the other hand, however, if a thyristor other than the selected one is erroneously turned off during the period of time for which it must be conducting, the forward voltage cannot be detected so that no re-firing pulse is delivered.

When the current through the thyristor valve decreases during the prescribed conduction period of the thyristor valve, some thyristors turn off and the others remain conductive since they have different holding currents. In this case, a reverse voltage appears once across every cut-off thyristor and then the reverse voltage is replaced by a forward voltage. In the case where only a part of the thyristors are cut off erroneously, the full voltage across the thyristor valve will be applied to the cut-off thyristors, resulting in damage to the thyristors. In the case of the above mentioned apparatus, however, no refiring pulse is delivered and no protecting operation is performed unless the selected one of the thyristors is included among the erroneously cut-off thyristors.

Another relevant prior art reference is U.S. Pat. No. 3,728,557, "CONTROL SCHEME FOR TIMING THE APPLICATION OF LIMITED DURATION FIRING SIGNALS TO POWER SWITCHING DEVICES". This discloses a gate controlling device which applies a limited duration firing signal to the thyristors in the forward voltage condition.

The object of this invention is to protect from the forward overvoltage a part of the thyristors which are erroneously cut-off during the period of conduction of the thyristor valve.

Another object of this invention is to provide an apparatus capable of performing the above protective operation by simply detecting the forward voltage across a selected one of the thyristors.

According to one of the features of this invention, a pulse generator provides a firing pulse to all the thyristors at the beginning of a prescribed period of conduction of the thyristor valve when a forward voltage appears across a selected one of the thyristors, and a current responsive circuit supplies a firing signal to all the thyristors when the valve current exceeds a predetermined value during the prescribed period of conduction of the thyristor valve.

Other objects, features and advantages of this invention will be apparent when one reads the following description of this invention with the aid of the attached drawings, in which:

FIGS. 2 and 3 show the waveforms of signals appearing at several points in the circuit shown in FIG. 1 when the thyristor valve is normally operating;

FIGS. 5 and 6 show the waveforms of the signals appearing at the same points in the circuit shown in FIG. 1 when all the thyristors is turned off when the thyristor valve must be conducting; and FIGS. 7 and 8 show the waveforms of the signals appearing at the same points in the circuit in FIG. 1 when a particular thyristor is turned off during the period of conduction of the thyristor valve.

Now, preferable embodiments of this invention will be described through the reference to the attached drawings.

Figure 1:
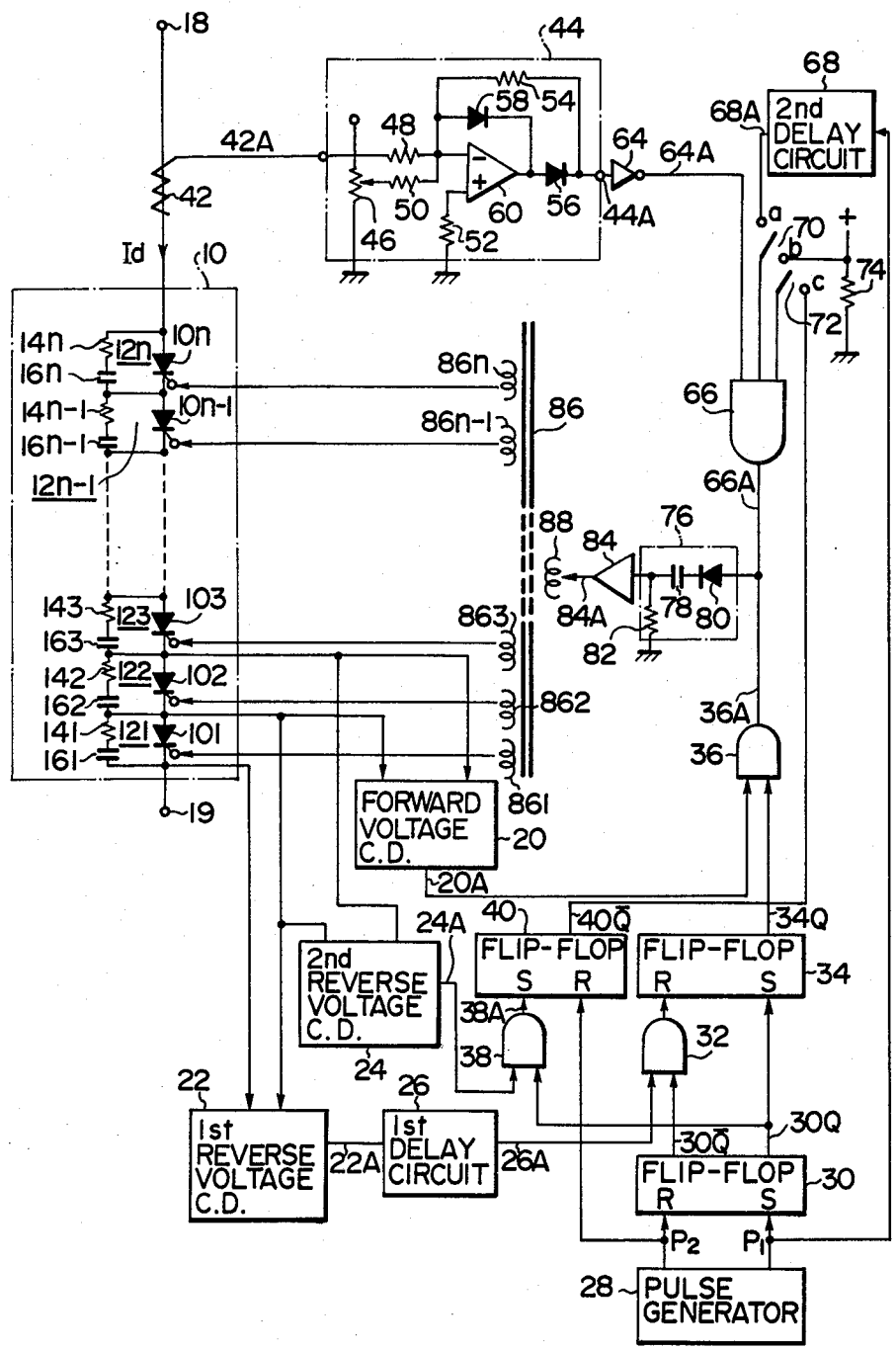
FIG. 1 is a circuit of a gate controlling apparatus for a thyristor valve, as an embodiment of this invention.

In FIG. 1, a thyristor valve 10 comprises a plurality of series-connected thyristors 101, 102, ..., 10$n$ and series circuits 121, 122, ..., 12$n$ connected in parallel respectively with the thyristors 101, 102, ..., 10$n$ for equalizing the voltages shared by the thyristors. The series circuits 121, 122, ..., 12$n$ are respectively composed of series circuits of a resistor 141 and a capacitor 161, a resistor 142 and a capacitor 162, ..., and a resistor 14$n$ and a capacitor 16$n$. The anode and cathode terminals 18 and 19 of the thyristor valve 10 are connected with, for example, one of the arms of the three-phase converter as shown in FIG. 1 of the above mentioned U.S. patent application Ser. No. 669,751.

A forward voltage condition detector 20 serves to detect the voltage across the thyristor 102 which has the minimum or smallest storage charge among all the thyristors constituting the thyristor valve 10, and when the detector 20 detects the forward voltage, it delivers an output 20A. A first reverse voltage condition detector 22 serves to detect the voltage across the thyristor 101 which has the maximum or largest storage charge among all the thyristors constituting the thyristor valve 10, and a second reverse voltage condition detector 24 serves to detect the voltage across the thyristor 102 having the minimum storage charge. These detectors 22 and 24 deliver respectively outputs 22A and 24A when they detect reverse voltages across the thyristors 101 and 102, respectively. A first delay circuit 26 delivers an output signal 26A when the output signal 22A of the first reverse voltage condition detector 22 lasts for a predetermined period $T_o$ of time. The output signal 26A vanishes when the output signal 22A is interrupted. The period $T_o$ of time is chosen to be longer than the maximum turn-off period of the thyristors 101 to 10n. A pulse generator 28 serves to determine the period for which the thyristor valve 10 is to be conductive, and to deliver first and second pulses $P_1$ and $P_2$ to a flip-flop 30 at the beginning and the end of the prescribed period of conduction of the thyristor valve, respectively. The flip-flop 30 is set by the first pulse $P_1$ to deliver a first output signal 30Q while the flip-flop 30 is reset by the second pulse $P_2$ to deliver a second output signal $30\overline{Q}$ and simultaneously to cause the first output signal 30Q to vanish. An AND circuit 32 delivers an output signal only when the first delay circuit 26 and the flip-flop 30 deliver the outputs 26A and $30\overline{Q}$, respectively. A flip-flop 34 is set by the output signal 30Q of the flip-flop 30 when it is in the set state, and reset by the output signal of the AND circuit 32. An AND circuit 36 delivers an output signal 36A in the case where the flip-flop 34 is in the set state and the output signals 34Q and 20A are both present. An AND circuit 38 delivers an output signal to set a flip-flop 40, when the output signal 24A of the second reverse voltage condition detector 24 and the output signal 30Q of the flip-flop 30 are both present. The flip-flop 40 is reset by the second pulse $P_2$ to deliver an output signal $40\overline{Q}$.

The output signal 42A of a dc current detector 42 for detecting the dc current $I_d$ flowing through the thyristor valve 10 is supplied to a comparator 44. The comparator 44 is composed of a potentiometer 46 for defining a preset dc current value $I_{dp}$, input resistors 48, 50 and 52, a feedback resistor 54, diodes 56 and 58, and an operational amplifier 60. The comparator 44 delivers an output signal 44A when the dc current $I_d$ exceeds the preset dc current value $I_{dp}$. The preset dc current value $I_{dp}$ is chosen to be greater than the maximum value among the holding current values of the thyristors constituting the thyristor valve 10. The output signal 44A of the comparator 44 is sent as a first input signal to an AND circuit 66 via an inverter 64. The AND circuit 66 also receives as a second input signal the output signal $40\overline{Q}$ of the flip-flop 40. A second delay circuit 68 delivers an output signal 68A retarded by 360°/n (n being the number of phases) with respect to the first pulse $P_1$, and the output signal 68A is supplied as a third input to the AND circuit 66. Since the ripple component contained in the dc current $I_d$ undulates every 360°/n, the output signal 68A should be delivered nearly at the instant when the dc current takes the minimum value while undulating. Changeover switches 70 and 72 serve to select the second and third inputs to the AND circuit 66. When the movable contact of the switch 70 is brought into contact with the stationary contact a, the output signal 68A of the second delay circuit 68 is sent to the AND circuit 66. When the movable contact of the switch 72 is brought into contact with the stationary contact c, the output signal $40\overline{Q}$ of the flip-flop 40 is sent to the AND circuit 66. If the movable contacts of the changeover switches 70 and 72 are both brought into contact with the stationary contact b, the potential at the terminal of a resistor 74 is applied to the AND circuit 66. Accordingly, the output signal 66A is delivered in response only to the output signal 64A, irrespective of the output signals 68A and $40\overline{Q}$.

A differentiating circuit 76 is composed of a capacitor 78, a diode 80 and a resistor 82, and delivers an output signal in accordance with the value obtained by differentiating the respective output signals 66A and 36A of the AND circuits 66 and 36. A pulse amplifier 84 amplifies the output of the differentiating circuit 76 and delivers its output signal 84A to the primary winding 88 of a pulse transformer 86. When the output signal 84A is supplied to the primary winding 88 of the pulse transformer 86, the secondary windings 861 to 86n of the pulse transformer 86 generate firing pulses, which are then supplied simultaneously to the thyristors 101 to 10n.

First, the case where the movable contacts of the switches 70 and 72 are both brought into contact with the stationary contact b, will be described with the aid of the operating waveforms shown in FIG. 2. Immediately, before an instant $t_1$, the thyristor valve 10 is cut off, with all the thyristors 101 to 10n cut off, so that the forward voltage as shown in FIG. 2(B) is applied to the respective thyristors. The output signal 20A of the forward voltage condition detector 20 responsive to the forward voltage developed across the thyristor 102 is as shown in FIG. 2(J). The flip-flop 30 is reset with the first output signal 30Q in the "0" state and the second output signal $30\overline{Q}$ in the "1" state as shown in FIGS. 2(E) and 2(F). At the instant $t_1$, the pulse generator 28 delivers the first pulse $P_1$ as shown in FIG. 2(C) to set the flip-flop 30 so that the first output signal 30Q takes the "1" state and the second output signal $30\overline{Q}$ the "0" state. The flip-flop 34 is set by the first output signal 30Q and the output signal 34Q takes the "1" state as shown in FIG. 2(I). Accordingly, the AND circuit 36 responsive to the outputs 20A and 34Q of the forward voltage condition detector 20 and the flip-flop 34 delivers the output signal 36A as shown in FIG. 2(K). The output signal 36A of the AND circuit 36 is differentiated by the differentiating circuit 76 and then amplified by the pulse amplifier 84. Upon reception of the output signal 84A, the pulse transformer 86 delivers the above-described narrow width pulses as firing signals to the thyristors 101 to 10n. Since all the thyristors have the forward voltage applied, they are immediately turned on so that the current $I_d$ begins to flow as shown in FIG. 2(A) and the voltages across the respective thyristors are reduced to zero. When all the thyristors are turned on, the output signal 20A of the forward voltage condition detector 20 vanishes so that the output signal 36A of the AND circuit 36 is reduced to zero. The output signal 44A of the comparator 44 responsive to the current $I_d$ through the thyristor valve 10, which takes the "1" state as shown in FIG. 3(B) when the current $I_d$ is less than the preset value $I_{dp}$, takes the "0" state when $I_d$ exceeds $I_{dp}$ at the instant $t_2$. Accordingly, the output signal 64A of the inverter 64 rises as shown in FIG. 3(C) and the AND circuit 66 delivers the output signal 66A. Then, all the thyristors receive firing pulses again and as in this case all the thyristors are conducting, they remain conductive.

At the end of the conduction period of the thyristor valve 10, firing pulses are supplied to the thyristors constituting another thyristor valve (not shown) as another arm of the three-phase converter mentioned at the beginning of the description of the embodiment and simultaneously the pulse generator 28 generates the second pulse $P_2$. When the second pulse $P_2$ is generated at the instant $t_3$ as shown in FIG. 2(D), the flip-flop 30 is reset to cause the first output signal 30Q to take the "0" state and the second output signal $30\overline{Q}$ to take the "1" state. When the second thyristor valve (not shown) is fired, the current $I_d$ through the thyristor valve 10 decreases to complete commutation. When the reverse current due to the stored charges starts decreasing, the reverse voltages appear across the thyristors 101 to 10n as shown in FIG. 2(B). The terminal voltage $V_{101}$ of the thyristor 101 having the maximum storage charge $Q_r$ has the shortest reverse voltage duration and the reverse voltage appears across the thyristor 101 latest while the forward voltage appears thereacross earliest. On the other hand, the terminal voltage $V_{s2}$ of the thyristor 102 having the minimum strange charge $Q_r$ has the longest reverse voltage duration and the reverse voltage appears across the thyristor 102 earliest while the forward voltage appears thereacross latest. At the instant $t_4$, the reverse voltage condition detector 22 responsive to the reverse voltage across the thyristor 101 delivers the output signal 22A as shown in FIG. 2(G) and the output signal 22A is supplied to the first delay circuit 26. If the reverse voltage duration lasts for a predetermined period $T_o$ of time, the first delay circuit 26 delivers the output signal 26A at the instant $t_5$ as shown in FIG. 2(H) and remains in the same state until the output signal 22A of the reverse voltage condition detector 22 has vanished.

The AND circuit 32 responsive to the output signals 26A and $30\overline{Q}$ of the first delay circuit 26 and the flip-flop 30 delivers an output to reset the flip-flop 34. In this case, therefore, no firing pulses are supplied to the thyristors even though the forward voltage condition detector 20 delivers the output signal 20A later at the instant $t_7$.

Figure 4:
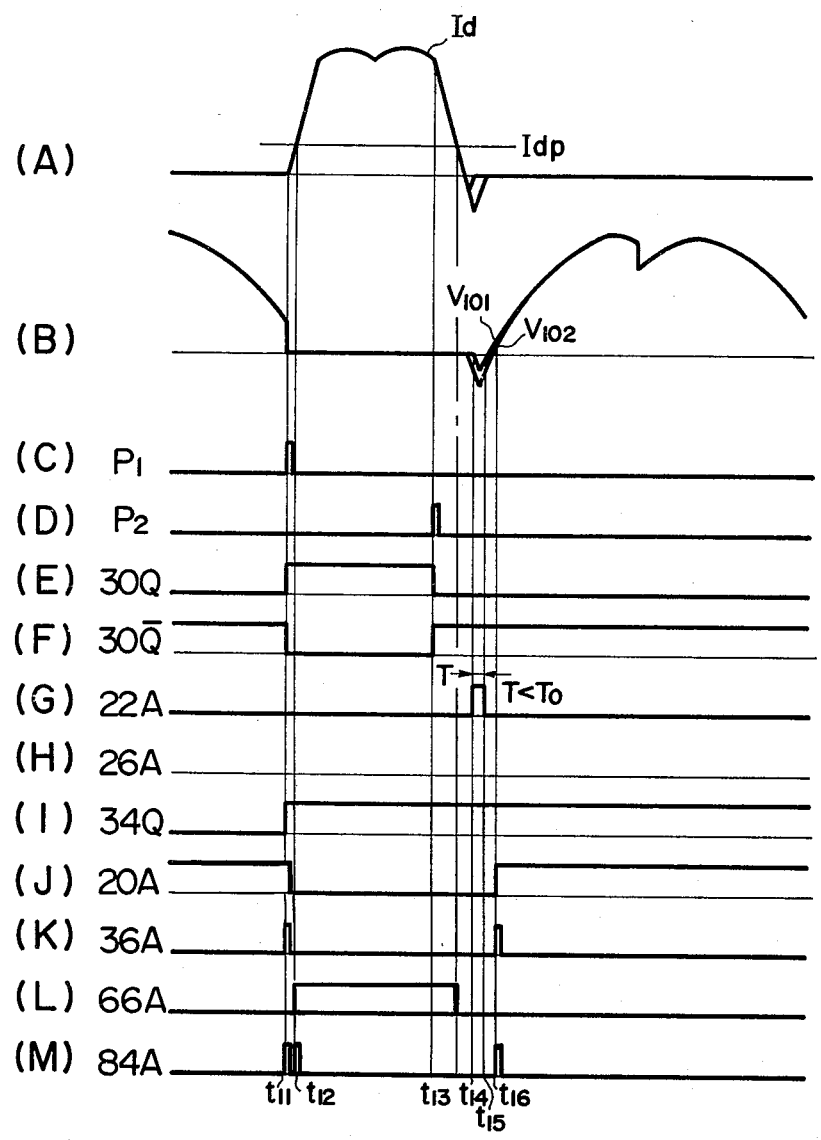
FIG. 4 shows the waveforms of the signals appearing at the same points in FIG. 1 when the reverse voltage duration is shortened.

If the marginal angle of commutation decreases due to, for example, the fluctuation of the power source voltage, the reverse voltage duration T is shortened as shown in FIG. 4 so that some thyristors fail to properly commutate. When the reverse voltage duration T is shorter than the predetermined period $T_o$ of time, the first delay circuit 26 delivers no output signal 26A as shown in FIG. 4(H) so that the AND circuit 32 delivers no output signal either. As a result, the flip-flop 34 is not reset and when the forward voltage condition detector 20 delivers the output signal 20A at the instant $t_{16}$, the AND circuit 36 delivers the output signal 36A so that firing pulses are supplied to all the thyristors. Therefore, even though some thyristors fail to commutate, no overvoltages are applied to the previously cut-off thyristors.

The cases will be described where the current $I_d$ decreases as shown in FIGS. 5 and 6 and intermits under the influence of the ripple component (undulates every 60° in case of a three-phase full-wave bridge). In these cases, the output signal 22A of the reverse voltage condition detector 22 appears at the instant $t_{23}$ after all the thyristors have been turned off. However, since the lasting period $T_1$ of the output signal 22A is shorter than the preset period $T_o$, no output signal 26A is delivered. Accordingly, the flip-flop 34 remains in the set state. When at the instant $t_{24}$ the forward voltage appears across the thyristor 102 having the minimum storage charge $Q_r$, the forward voltage condition detector 20 delivers the output signal 20A to the AND circuit 36. Hence, the AND circuit 36 delivers the output signal 36A as shown in FIG. 5(K) to supply all the thyristors with firing pulses. Since when the forward voltage is applied to the thyristor 102 all the other thyristors are also supplied with the forward voltages, the thyristors 101 to 10n are immediately turned on. Upon the conduction of the thyristor 102, the output signal 20A of the forward voltage condition detector 20 vanishes and the output signal 36A also vanishes.

When the current $I_d$ through the thyristor valve 10 increases in excess of the predetermined value $I_{dp}$, the AND circuit 66 delivers the output signal 66A at the instant $t_{25}$ in the same manner as described above. However, all the thyristors have already been turned on and remain in the same state.

The case will next be described where the current $I_d$ through the thyristor valve 10 so decreases that a particular thyristor, for example, the thyristor 103 having the greatest holding current $I_{h3}$ is erroneously turned off during the period for which the thyristor valve 10 must be conducting. When the current $I_d$ through the thyristor valve 10 falls below the holding current $I_{h3}$ of the thyristor 103 at the instant $t_{33}$ so that the thyristor 103 is turned off at the instant $t_{33}$, as shown in FIGS. 7 and 8, the current $I_d$ flows through the series circuit of the resistor 143 and the capacitor 163, connected in parallel with the thyristor 103. In this case, as shown in FIG. 7(B), the reverse voltage appears once across the thyristor 103 and then the forward voltage is applied to the thyristor 103. The forward voltage condition detector 20, which serves to detect the voltage across the thyristor 102, delivers no output signal 20A since all the thyristors except the thyristor 103 are conductive. As a result, the AND circuit 36 delivers no output signal 36A as shown in FIG. 7(K).

On the other hand, when the current $I_d$ through the thyristor valve 10 again exceeds the predetermined dc current $I_{dp}$ at the instant $t_{34}$ after it falled once below the preset value $I_{dp}$, the output signal 66A is delivered as described above as shown in FIG. 8(D) so that firing pulses are resupplied to all the thyristors. At the instant $t_{34}$ at which the firing pulses are resupplied to all the thyristors, the current $I_d$ through the thyristor valve 10 is greater than the holding current $I_{h3}$ of the thyristor 103 so that the thyristor 103 remains conductive after the firing pulses have vanished. Therefore, even though a particular thyristor is erroneously turned off because of its smaller holding current, it can be immediately refired to be protected from the overvoltage as indicated by dashed curve in FIG. 7(B). When the thyristor (thyristor 103 in this case) is not refired, the voltage across the thyristor rises as indicated by the dashed curve in FIG. 7(B).

The case will be described below where the movable contact of the switch 72 is brought into contact with the stationary contact c. It is initially assumed that the current $I_d$ through the thyristor valve 10 decreases and becomes smaller than the preset value $I_{dp}$. Then, when the current $I_d$ increases and again exceeds the value $I_{dp}$, the inverter 64 delivers the first input signal 64A to the AND circuit 66 as described with FIGS. 7 and 8. As seen from FIGS. 7 and 8, when a particular thyristor, for example, thyristor 103 is cut off, the thyristor 102 is conductive and the output signals 24A and 38A of the second reverse voltage condition detector 24 and the AND circuit 38 do not exist so that the flip-flop 40 remains in the reset state. The flip-flop 40 therefore is supplying its output signal 40$\overline{Q}$ to the AND circuit 66 and when the current $I_d$ through the thyristor valve 10 exceeds the preset value $I_{dp}$, firing pulses are supplied to all the thyristors 101 to 10$n$ as described above so that a protective operation is performed to protect the thyristor 103 in this case from the overvoltage. On the other hand, when all the thyristors are turned off as shown in FIG. 5, the reverse voltage appears across the thyristor 102 so that the reverse voltage condition detector 24 delivers the output signal 24A to the AND circuit 38. Since the AND circuit 38 also receives as an input the output signal 30Q of the flip-flop 30, the AND circuit 38 immediately delivers the output signal 38A to set the flip-flop 40. Accordingly, the output 40$\overline{Q}$ of the flip-flop 40 takes the "0" state and the AND circuit 66 delivers no output signal 66A even though it receives the output signal 64A of the inverter 64. This is because, if all the thyristors are turned off, each thyristor is only to bear its rated voltage and therefore no special protective operation is needed. Namely, untimely firing pulses can be prevented from being generated by bringing the movable contact of the switch 72 in contact with the stationary contact c.

In the case where the switch 70 selects the stationary contact a, the signal retarded by about 60° from the first pulse P$_1$ is supplied through the second delay circuit 68 to the AND circuit 66. Accordingly, the AND circuit 66 causes firing pulses to be applied to all the thyristors only when the thyristor valve current $I_d$ is greater than the preset value $I_{dp}$, no reverse voltage appears across the thyristor 102, and the second delay circuit 68 is delivering the output signal 68A. In general, concerning the three-phase full-wave converter, the current through the thyristor valve contains a ripple component appearing every 60° and it is possible to supply a firing pulse to a particular thyristor at the time when the particular thyristor tends to be erroneously turned off. Namely, the untimely application of firing pulse to thyristors can be prevented.

What is claimed is:

1. A gate controlling apparatus for a thyristor valve including a plurality of series connected thyristors having different holding currents from each other and series circuits each including a capacitor and a resistor and connected in parallel with each thyristor of the thyristor valve, said apparatus comprising:
   means for generating a pulse to fire the thyristors;
   forward voltage responsive means connected across a selected one of the thyristors for producing an output signal indicative of forward voltage condition thereacross;
   circuit means for producing an output signal in response to the simultaneous presence of the pulse of said pulse generating means and the output signal of said forward voltage responsive means;
   current responsive means for producing an output signal when a current of the thyristor valve exceeds a predetermined current value higher than the highest holding current among those of the thyristors of the thyristor valve; and
   pulse supplying means for providing a narrow width firing pulse to each of the thyristors of the thyristor valve in response to at least one of the output signals of said circuit means and said current responsive means, the duration of the narrow width firing pulse being substantially equal to the time required to establish the thyristors in a conductive state.

2. A gate controlling apparatus for a thyristor valve as claimed in claim 1, in which said forward voltage responsive means is connected across the selected one of the thyristors having the smallest storage charge among the thyristors of the thyristor valve.

3. A gate controlling apparatus for a thyristor valve as claimed in claim 1, further comprising:
   reverse voltage responsive means producing an output signal indicative of reverse voltage condition of another selected one of the thyristors; and
   means for preventing the output signal of said current responsive means from being applied to said pulse supplying means in response to the output signal of said reverse voltage responsive means when all thyristors are turned off during the prescribed period of conduction of the thyristor valve.

4. A gate controlling apparatus for a thyristor valve as claimed in claim 1, further comprising:
   a delay circuit for producing an output signal at the time delayed by about 360°/n (n being equal to the number of phases) with respect to the pulse of said pulse generating means, said delay circuit preventing the output signal of said current responsive means from being applied to said pulse supplying means when no output signal of said delay circuit exists.

5. A gate controlling apparatus for a thyristor valve including a plurality of series-connected thyristors having different holding current from each other and series circuits each including a capacitor and a resistor and connected in parallel with each thyristor of the thyristor valve, said apparatus comprising:
   a pulse generator for producing a first pulse to fire the thyristors, and a second pulse delayed for a prescribed period of conduction of the thyristor valve after the first pulse;
   a first flip-flop circuit having first and second outputs for producing first and second output signals respectively therefrom, said first flip-flop circuit being set by the first pulse and reset by the second pulse;
   a first reverse voltage condition detector having an output for producing an output signal indicative of reverse voltage condition of a first selected one of the thyristors having the largest storage charge among the thyristors of the thyristor valve;
   a first delay circuit having an input operatively connected to the output of said first voltage condition detector, said first delay circuit providing an output signal when the output signal of the first reverse voltage condition detector continues over a predetermined period of time longer than the longest turn-off time of the thyristors,
   first circuit means producing an output signal in response to the simultaneous presence of the output signal of said first delay circuit and the second output signal of said first flip-flop circuit;
   a second flip-flop circuit being set by the first output signal of said first flip-flop circuit and reset by the output signal of said first circuit means;
   a forward voltage condition detector connected across a second selected one of the thyristors having the smallest storage charge among the thyristors of the thyristor valve, for producing an output signal indicative of forward voltage condition thereacross;

second circuit means for producing an output signal in response to the simultaneous presence of the output signals of said second flip-flop circuit and said forward voltage condition detector;

current responsive means for producing an output signal when a current of the thyristor valve exceeds a predetermined current value higher than the highest holding current among the thyristors of the thyristor valve;

a second reverse voltage condition detector producing an output signal indicative of reverse voltage condition of said second selected one of the thyristors having the smallest storage charge among the thyristors;

third circuit means for producing an output signal in response to the simultaneous presence of the output signal of said second reverse voltage condition detector and the first output signal of said first flip-flop circuit;

third flip-flop circuit being set by the output signal of said third circuit means and reset by the second pulse of said pulse generator, said third flip-flop circuit producing an output during its reset state;

second delay circuit producing an output signal at the time delayed about 360°/n (n being equal to the number of phases) with respect to the pulse of said pulse generator;

fourth circuit means for producing an output signal in response to the simultaneous presence of output signals of said third flip-flop circuit, said current responsive means and said second delay circuit; and pulse supplying means for providing a narrow width firing pulse to each of the thyristors of the thyristor valve when at least one of the output signals of said second and third circuit means is applied, the duration of the narrow width pulse being substantially equal to the time required to establish the thyristors in a conductive state.

6. A gate controlling apparatus for a thyristor valve including a plurality of series-connected thyristors having different holding current from each other and series circuits each including a capacitor and a resistor and connected in parallel with each thyristor of the thyristor valve, said apparatus comprising:

a pulse generator for producing a first pulse to fire the thyristors, and a second pulse delayed for a prescribed period of conduction of the thyristor valve after the first pulse;

a first flip-flop circuit having first and second outputs for producing first and second signals respectively therefrom, said first flip-flop circuit being set by the first pulse and reset by the second pulse;

a first reverse voltage condition detector having an output for producing an output signal indicative of reverse voltage condition of a selected one of the thyristors having the largest storage charge among the thyristors of the thyristor valve;

a first delay circuit having an input operatively connected to the output of said first reverse voltage condition detector, said first delay circuit providing an output signal when the output signal of the first reverse voltage condition detector continues over a predetermined period of time longer than the longest turn-off time of the thyristors;

first circuit means producing an output signal in response to the simultaneous presence of the output signal of said first delay circuit and the second output signal of said first flip-flop circuit;

a second flip-flop circuit being set by the first output signal of said first flip-flop circuit and reset by the output signal of said first circuit means;

a forward voltage condition detector connected across a second selected one of the thyristors having the smallest storage charge among the thyristors of the thyristor valve, for producing an output signal indicative of forward voltage condition thereacross;

second circuit means for producing an output signal in response to the simultaneous presence of the output signals of said second flip-flop circuit and said forward voltage condition detector;

current responsive means for producing an output signal when a current of the thyristor valve exceeds a predetermined current value higher than the highest holding current among the thyristors of the thyristor valve;

a second reverse voltage condition detector producing an output signal indicative of reverse voltage condition of said second selected one of said thyristors having the smallest storage charge among the thyristors;

third circuit means for producing an output signal in response to the simultaneous presence of the output signal of said second reverse voltage condition detector and the first output signal of said first flip-flop circuit;

third flip-flop circuit being set by the output signal of said third circuit means and reset by the second pulse of said pulse generator, said third flip-flop circuit producing an output signal during its reset state;

fourth circuit means for producing an output signal in response to the simultaneous presence of output signals of said third flip-flop circuit and said current responsive means; and pulse supplying means for providing a narrow width firing pulse to each of the thyristors of the thyristor valve when at least one of the output signals of said second and third circuit means is applied, the duration of the narrow width pulse being substantially equal to the time required to establish the thyristors in a conductive state.

* * * * *